United States Patent
Tehranipoor et al.

(10) Patent No.: US 11,604,912 B2
(45) Date of Patent: Mar. 14, 2023

(54) HARDWARE DEPROCESSING USING VOLTAGE IMAGING FOR HARDWARE ASSURANCE

(71) Applicant: University of Florida Research Foundation, Incorporated, Gainesville, FL (US)

(72) Inventors: Mark M. Tehranipoor, Gainesville, FL (US); Navid Asadi-Zanjani, Gainesville, FL (US); Olivia Pauline Paradis, Gainesville, FL (US); Nitin Varshney, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 248 days.

(21) Appl. No.: 17/167,381

(22) Filed: Feb. 4, 2021

(65) Prior Publication Data
US 2021/0264082 A1 Aug. 26, 2021

Related U.S. Application Data

(60) Provisional application No. 62/979,031, filed on Feb. 20, 2020.

(51) Int. Cl.
*G06F 30/323* (2020.01)
*G06F 30/327* (2020.01)
(Continued)

(52) U.S. Cl.
CPC ............ *G06F 30/323* (2020.01); *G06F 30/20* (2020.01); *G06F 30/327* (2020.01); *G06F 30/331* (2020.01); *G06T 7/50* (2017.01)

(58) Field of Classification Search
CPC ...... G06F 30/323; G06F 30/20; G06F 30/327; G06F 30/331; G06F 2111/08; G06T 7/50
See application file for complete search history.

(56) References Cited

U.S. PATENT DOCUMENTS 10,573,547 B1 * 2/2020 Trujillo ............... H01L 21/6835
10,903,044 B1 * 1/2021 Litman ............ H01L 27/11556
(Continued)

OTHER PUBLICATIONS

"Plasma FIB Deprocessing of Integrated Circuits From the Backside", by E.L. Principe, Navid Asadizanjani, Domenic Forte, Mark Tehranipoor, Robert Chivas, Michael DiBattista, and Scott Silverman , Electronic Device Failure Analysis, Nov. 2017.*
(Continued)

*Primary Examiner* — Nha T Nguyen
(74) *Attorney, Agent, or Firm* — Alston & Bird LLP

(57) ABSTRACT

Embodiments of the present disclosure provide methods, apparatus, systems, computing devices, computing entities for setting deprocessing parameters used in conducting hardware deprocessing on a hardware. In accordance with one embodiment, a method is provided that includes: receiving sample images using different E-beam voltages, wherein each image is captured from a backside of the hardware using a different E-beam voltage; generating thickness-based contour maps, wherein each map is generated for an image and includes contour lines indicating locations having a same thickness of remaining material; generating estimated E-beam penetration depths, wherein each depth is generated for an image and is based at least in part on the E-beam voltage used to capture the image; generating an estimated thickness measurement of the remaining material based at least in part on the contour maps and the penetration depths; and setting the deprocessing parameters based at least in part on the estimated thickness measurement.

20 Claims, 12 Drawing Sheets

(51) Int. Cl.
*G06T 7/50* (2017.01)
*G06F 30/331* (2020.01)
*G06F 30/20* (2020.01)

(56) References Cited

U.S. PATENT DOCUMENTS

| | | | |
|---|---|---|---|
| 2008/0233751 A1* | 9/2008 | Barton | H01L 22/24 |
| | | | 438/693 |
| 2013/0118896 A1* | 5/2013 | Foster | G01N 1/32 |
| | | | 204/298.36 |
| 2017/0239840 A1* | 8/2017 | Adams | G05D 11/137 |
| 2019/0311881 A1* | 10/2019 | Lavely | H01J 37/28 |
| 2020/0302584 A1* | 9/2020 | Zhang | G06T 7/001 |
| 2021/0264082 A1* | 8/2021 | Tehranipoor | G06T 7/50 |
| 2022/0005669 A1* | 1/2022 | Pawlowicz | H01J 37/31 |
| 2022/0321127 A1* | 10/2022 | Oh | H03K 19/1776 |

OTHER PUBLICATIONS

Hovington, Pierre et al. *CASINO: A New Monte Carlo Code in C Language For Electron Beam Interaction—Part I: Description of the Program*, Scanning, vol. 19, Issue 1, pp. 1-14, Jan. 1997. Manuscript Received: Dec. 29, 1995; Manuscript Accepted: Apr. 10, 1996; First Published Online: Dec. 7, 1996. DOI: 10.1002/sca.4950190101.

Bausells, J. *Electron Interaction With Solids—Single Scattering Monte Carlo Simulation Software*, EISS—Electron Beam Monte Carlo Simulator—Institute de Microelectrónica de Barcelona—Centre Nacional de Microelectrònica, Version 3.1, 2004 (v. 1.0)—2008 (v. 3.0), (7 pages). (article, online). [Retrieved from the Internet Apr. 19, 2021] <URL: http://nanonems.imb-cnm.csic.es/index.php?option=com_content&view=article&id=25%3Aeiss-electron-beam-monte-carlo-simulator&catid=2%3Ananofabrication&Itemid=9&lang=en>.

* cited by examiner

Remove the outer Package of the IC to expose the backside of the silicon die of the IC
501

Perform planarization and ultra-thinning on the backside to generate an ultra-thinned sample
502

Generate the set of sample images by collecting images of the ultra-thinned sample using a set of different e-beam voltages and at a set of desired backside locations
503

HARDWARE DEPROCESSING USING VOLTAGE IMAGING FOR HARDWARE ASSURANCE

CROSS-REFERENCE TO RELATED APPLICATIONS

This application claims the benefit of U.S. Provisional Patent Application Ser. No. 62/979,031, filed Feb. 20, 2020, which is incorporated herein by reference in its entirety, including any figures, tables, and drawings.

GOVERNMENT SUPPORT

This invention was made with government support under HQ072719P0020 awarded by the US Department of Defense. The government has certain rights in the invention.

BACKGROUND

Physical inspection for hardware assurance has gained a lot of attention over the past few years. There are still many challenges left open to address before a fast and fully-automated system for physical inspection is available. Reverse engineering (RE) and Trojan scanner (TS) are examples of the techniques used for physical inspection of integrated circuits (ICs). RE can fully analyze an IC and extract the structure, connectivity, and functionality of the chip, but is time-consuming and labor-intensive. TS can authenticate an IC much faster, but it does not provide information on the full functionality of the chip. Accordingly, various embodiments of the present invention described herein address technical challenges related to hardware deprocessing used within a hardware assurance process.

BRIEF SUMMARY

In general, embodiments of the present disclosure provide methods, apparatus, systems, computing devices, computing entities, and/or the like for setting one or more deprocessing parameters used in conducting hardware deprocessing on a hardware. In accordance with one aspect of the present disclosure, a method is provided. In various embodiments, the method comprises: receiving, via one or more processors, a set of sample images using a plurality of electron beam (E-beam) voltages for the hardware, wherein each sample image of the set of sample images is captured from a backside of the hardware using an E-beam voltage of the plurality of E-beam voltages; generating, via the one or more processors, a set of thickness-based contour maps, wherein each thickness-based contour map of the set of thickness-based contour maps is generated for a sample image of the set of sample images and comprises one or more contour lines indicating locations on the backside of the hardware having a same thickness of remaining material; generating, via the one or more processors, a set of estimated E-beam penetration depths, wherein each estimated E-beam penetration depth of the set of estimated E-beam penetration depths is generated for a sample image of the set of sample images and is based at least in part on the E-beam voltage used to capture the sample image; generating, via the one or more processors, an estimated thickness measurement of the remaining material for the backside of the hardware based at least in part on the set of thickness-based contour maps and the set of estimated E-beam penetration depths; and setting, via the one or more processors, the one or more deprocessing parameters based at least in part on the estimated thickness measurement.

In accordance with another aspect of the present disclosure, an apparatus is provided. In various embodiments, the apparatus includes at least one processor and at least one memory including program code. The at least one memory and the program code are configured to, with the at least one processor, cause the apparatus to at least: receive a set of sample images using a plurality of electron beam (E-beam) voltages for the hardware, wherein each sample image of the set of sample images is captured from a backside of the hardware using an E-beam voltage of the plurality of E-beam voltages; generate a set of thickness-based contour maps, wherein each thickness-based contour map of the set of thickness-based contour maps is generated for a sample image of the set of sample images and comprises one or more contour lines indicating locations on the backside of the hardware having a same thickness of remaining material; generate a set of estimated E-beam penetration depths, wherein each estimated E-beam penetration depth of the set of estimated E-beam penetration depths is generated for a sample image of the set of sample images and is based at least in part on the E-beam voltage used to capture the sample image; generate an estimated thickness measurement of the remaining material for the backside of the hardware based at least in part on the set of thickness-based contour maps and the set of estimated E-beam penetration depths; and set the one or more deprocessing parameters based at least in part on the estimated thickness measurement.

In accordance with yet another aspect of the present disclosure, a computer program product is provided. In particular embodiments, the computer program product includes a non-transitory computer storage medium having instructions stored therein. The instructions being configured to cause one or more computer processors to at least perform operations configured to: receive a set of sample images using a plurality of electron beam (E-beam) voltages for the hardware, wherein each sample image of the set of sample images is captured from a backside of the hardware using an E-beam voltage of the plurality of E-beam voltages; generate a set of thickness-based contour maps, wherein each thickness-based contour map of the set of thickness-based contour maps is generated for a sample image of the set of sample images and comprises one or more contour lines indicating locations on the backside of the hardware having a same thickness of remaining material; generate a set of estimated E-beam penetration depths, wherein each estimated E-beam penetration depth of the set of estimated E-beam penetration depths is generated for a sample image of the set of sample images and is based at least in part on the E-beam voltage used to capture the sample image; generate an estimated thickness measurement of the remaining material for the backside of the hardware based at least in part on the set of thickness-based contour maps and the set of estimated E-beam penetration depths; and set the one or more deprocessing parameters based at least in part on the estimated thickness measurement.

In particular embodiments, the hardware deprocessing is conducted on the hardware using the one or more deprocessing parameters after setting the one or more deprocessing parameters based at least in part on the estimated thickness measurement. In addition, in particular embodiments, annotation data for the hardware is generated, wherein the annotation data is based at least in part on the estimated thickness measurement, and a netlist is extracted for the hardware using the annotation data after conducting the hardware deprocessing on the hardware. In some embodiments, setting the one or more deprocessing parameters involves determining a difference between the estimated thickness measurement and a desired thickness of the hardware and responsive to the difference satisfying a configurable threshold, adjusting a deprocessing rate.

In particular embodiments, the set of thickness-based contour maps is generated, for each thickness-based contour map of the set of thickness-based contour maps, by cropping a sample image of the set of sample images to a region of interest to generate a cropped image; blurring the cropped image using a lowpass filter to generate a blurred image; detecting a superpixel over-segmentation on the blurred image to generate an over-segmented image; performing size-based thresholding on a set of segments of the over-segmented image to generate a threshold-applied image; performing contour smoothing on the threshold-applied image using morphological opening and closing to obtain a smoothed image; and extracting a contour map from the smoothed image. In addition, in particular embodiments, the set of estimated E-beam penetration depths is generated, for each estimated E-beam penetration depth of the set of estimated E-beam penetration depths, by conducting a Monte Carlo simulation on a sample image of the set of sample images captured using an E-beam voltage of the plurality of E-beam voltages to generate the estimated E-beam penetration depth for the sample image.

In some embodiments, the set of sample images are captured using a scanning electron microscope incorporated with focused ion beam. In addition, in some embodiments, planarization and ultra-thinning are performed on the backside of the hardware prior to capturing the set of sample images. Further, in some embodiments, the hardware comprises an integrated circuit, the backside comprises a silicon die, and the remaining material comprises silicon.

BRIEF DESCRIPTION OF THE DRAWINGS

Figure 1:
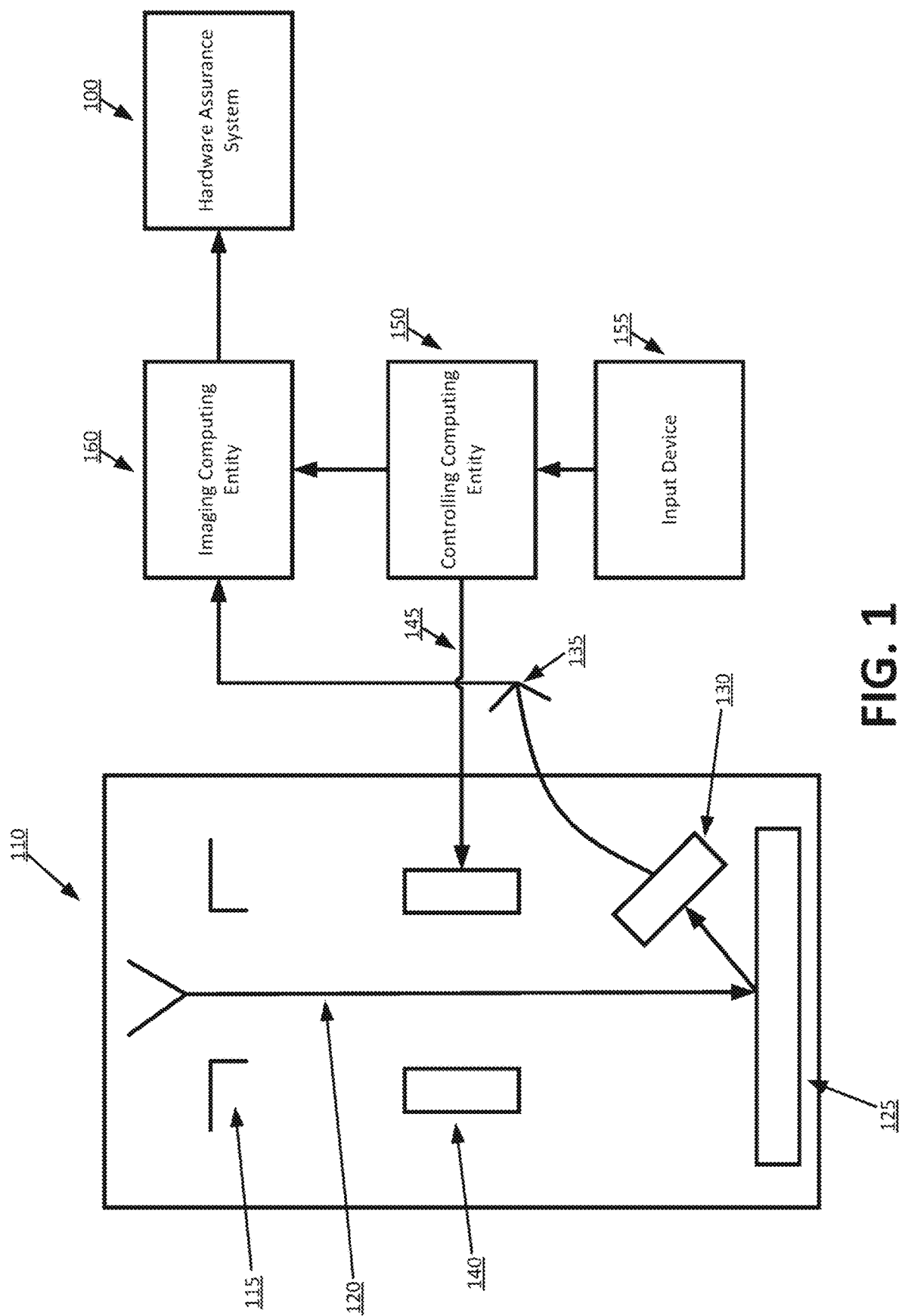

Having thus described the invention in general terms, reference will now be made to the accompanying drawings, which are not necessarily drawn to scale, and wherein:

FIG. 1 is a schematic of a scanning electron microscope system that may be used to practice embodiments of the present invention.

Figure 2:
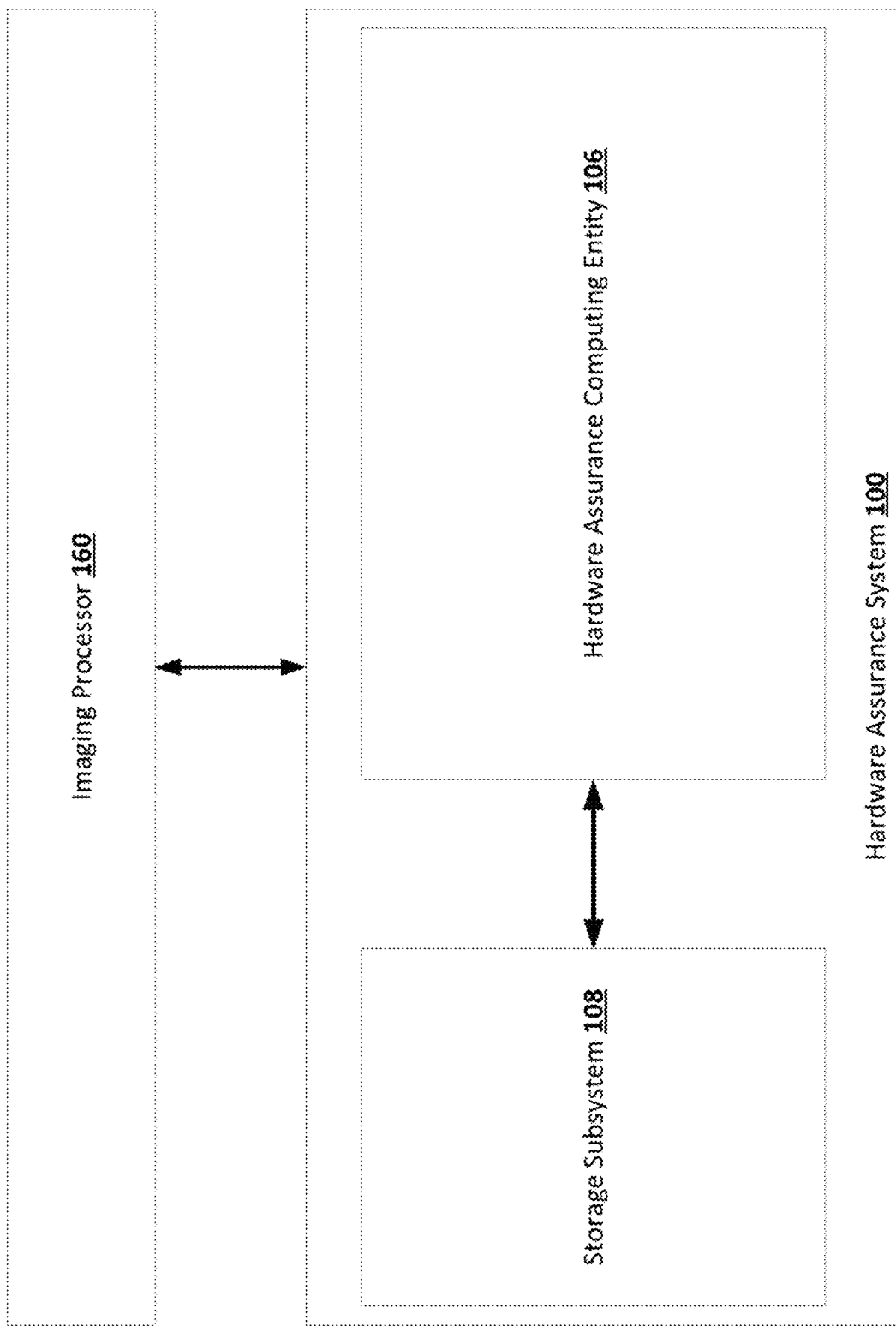

FIG. 2 provides an exemplary overview of a hardware architecture that can be used to practice embodiments of the present invention.

Figure 3:
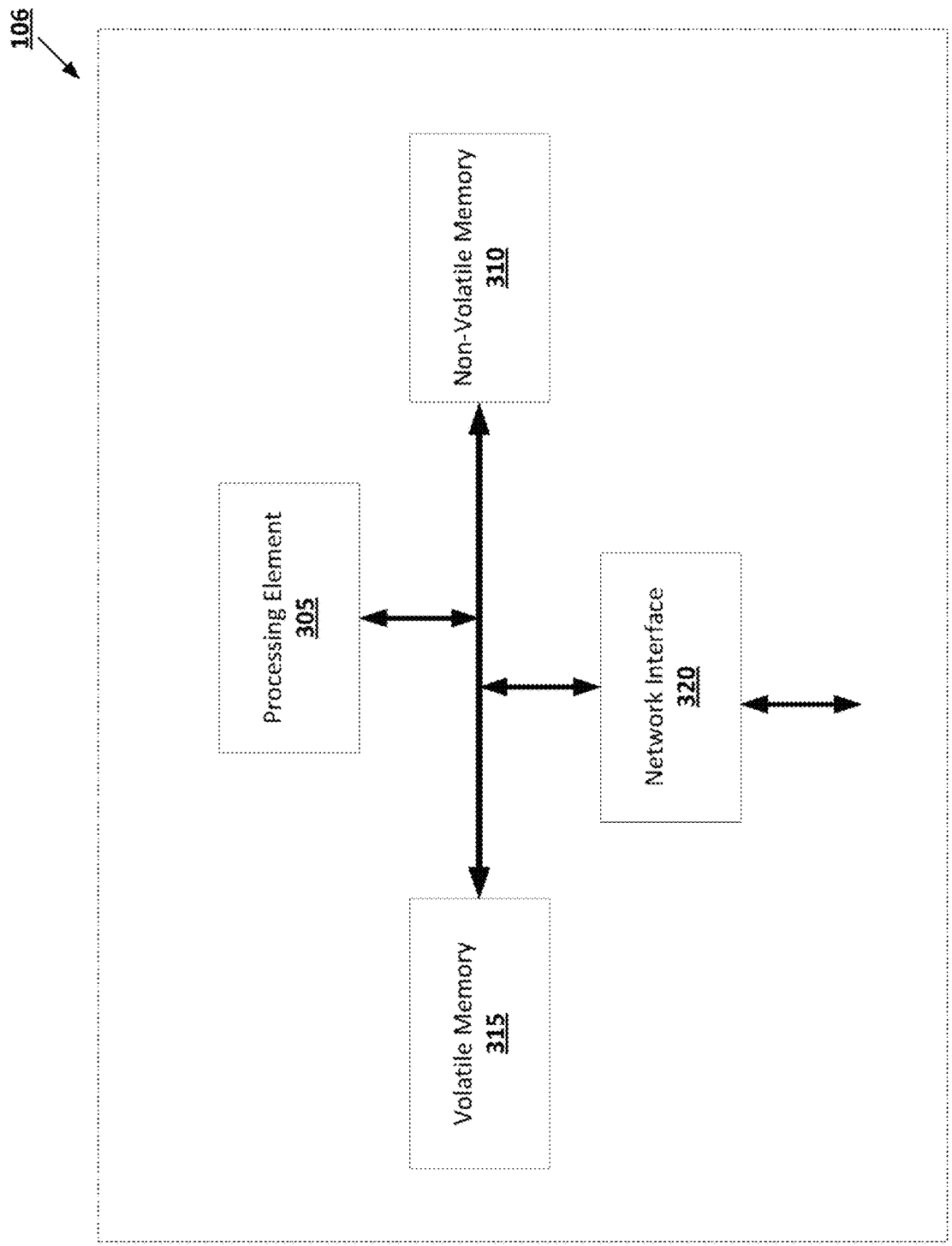

FIG. 3 provides an example hardware assurance computing entity that can be used to practice various embodiments of the present invention.

Figure 4:
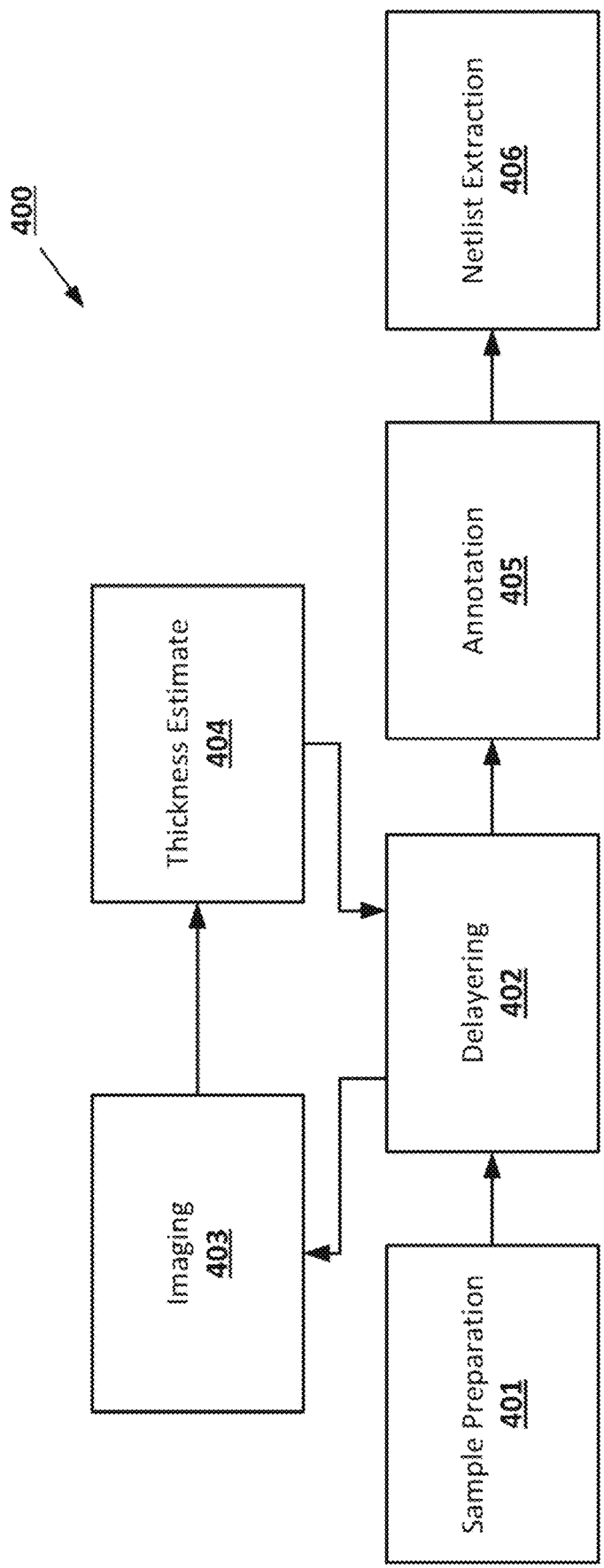

FIG. 4 is a flowchart diagram of an example process for performing hardware assurance in accordance with various embodiments of the present invention.

Figure 5:
Figure 5:

FIG. 5 is a flowchart diagram of an example process for performing sample preparation in accordance with various embodiments of the present invention.

Figure 6:
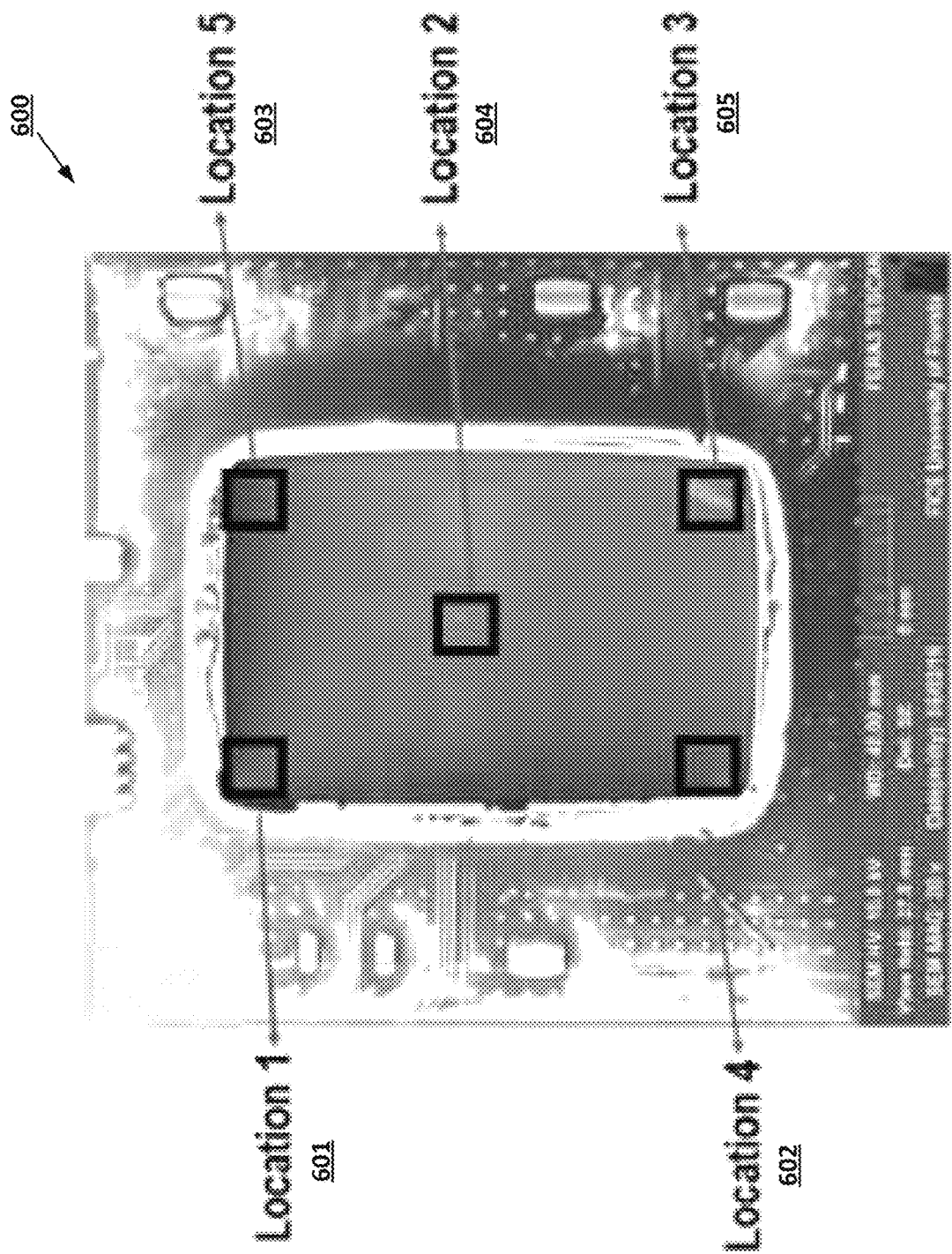

FIG. 6 depicts an example of image generation locations on a silicon die that may be used in accordance with various embodiments of the present invention.

Figure 7:
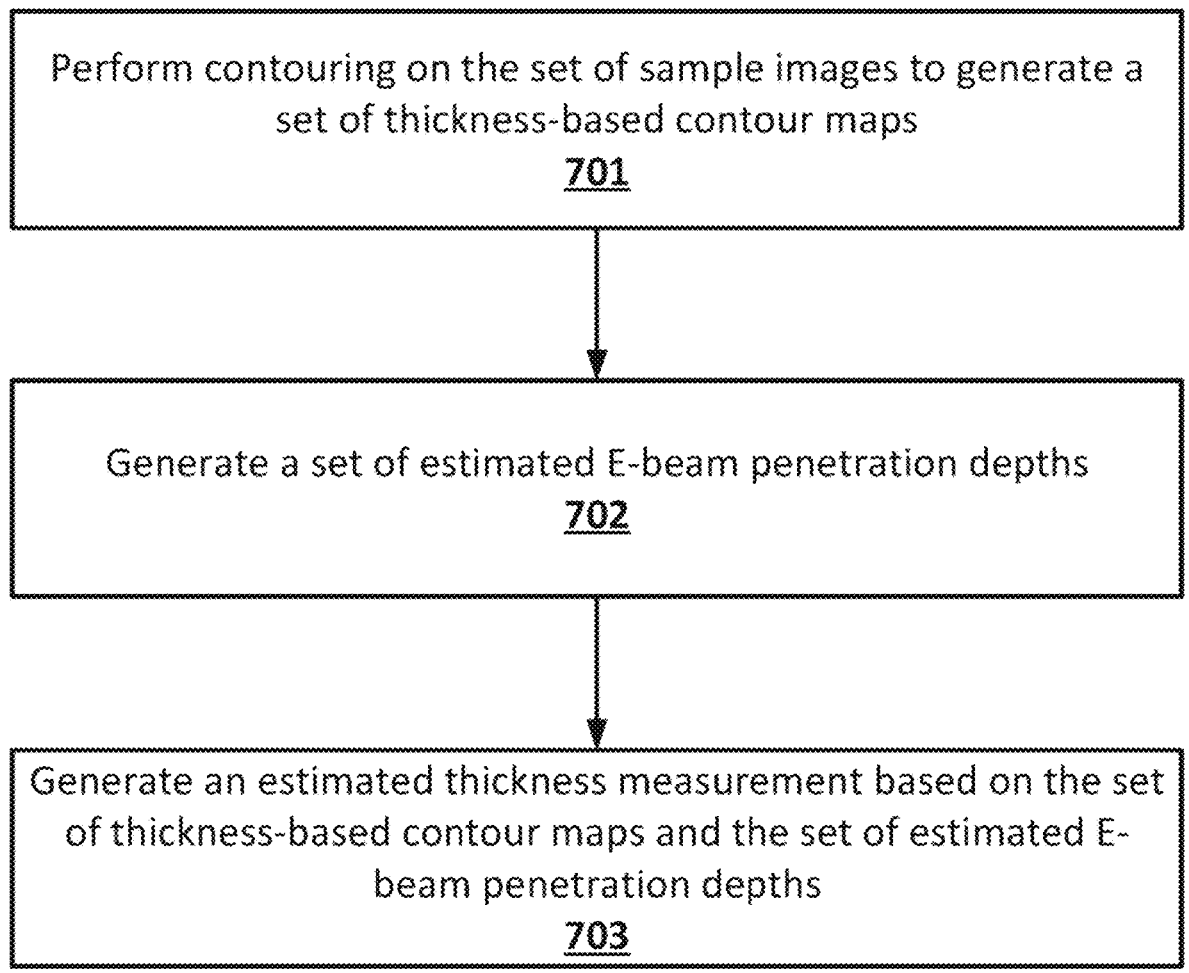

FIG. 7 is a flowchart diagram of an example process for performing iterative in-situ delayering in accordance with various embodiments of the present invention.

Figure 8:
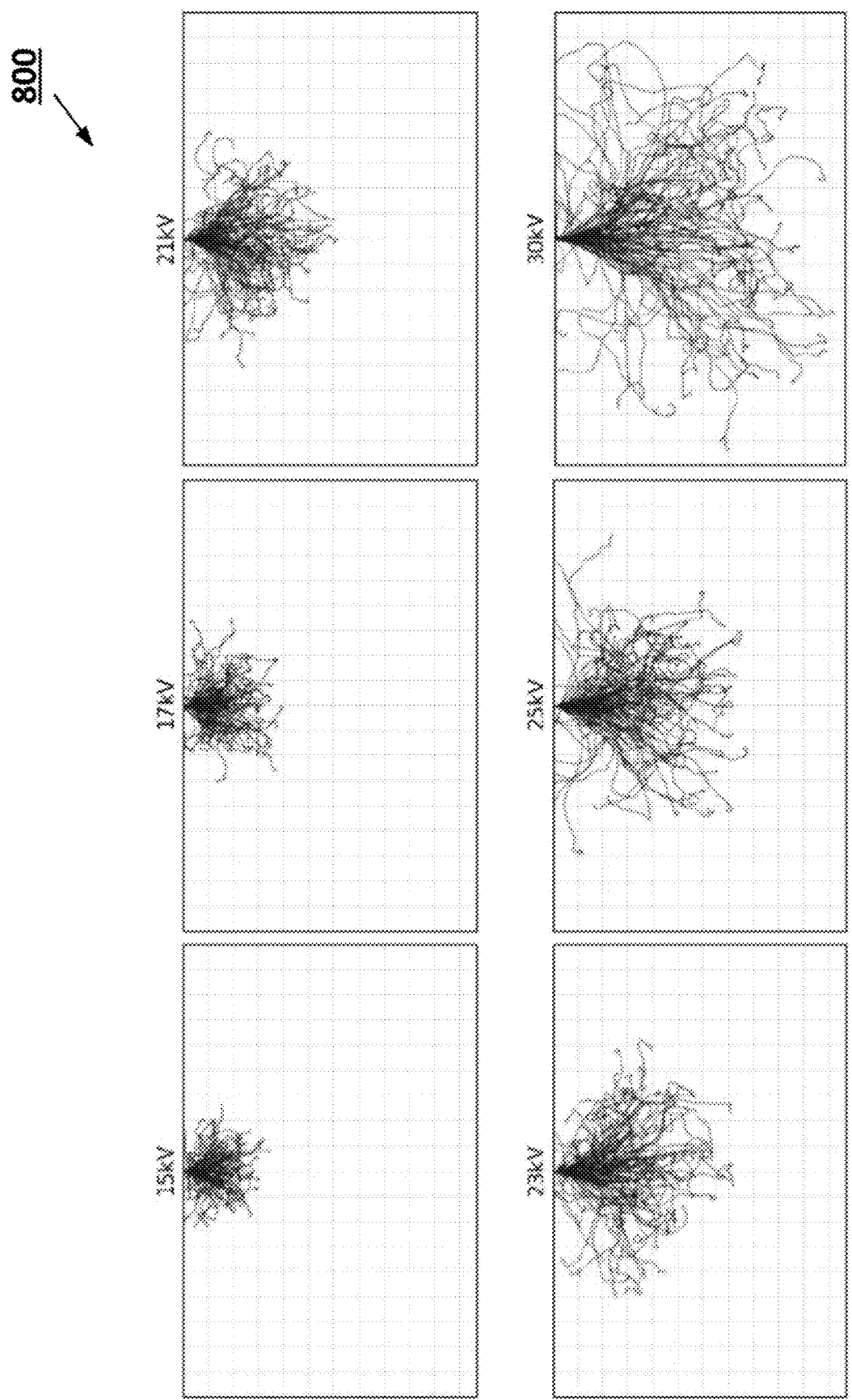

FIG. 8 depicts an example Monte Carlo simulation of electron trajectories in a bulk sample of silicon at different accelerating voltages that may be used in accordance with various embodiments of the present invention.

Figure 9:
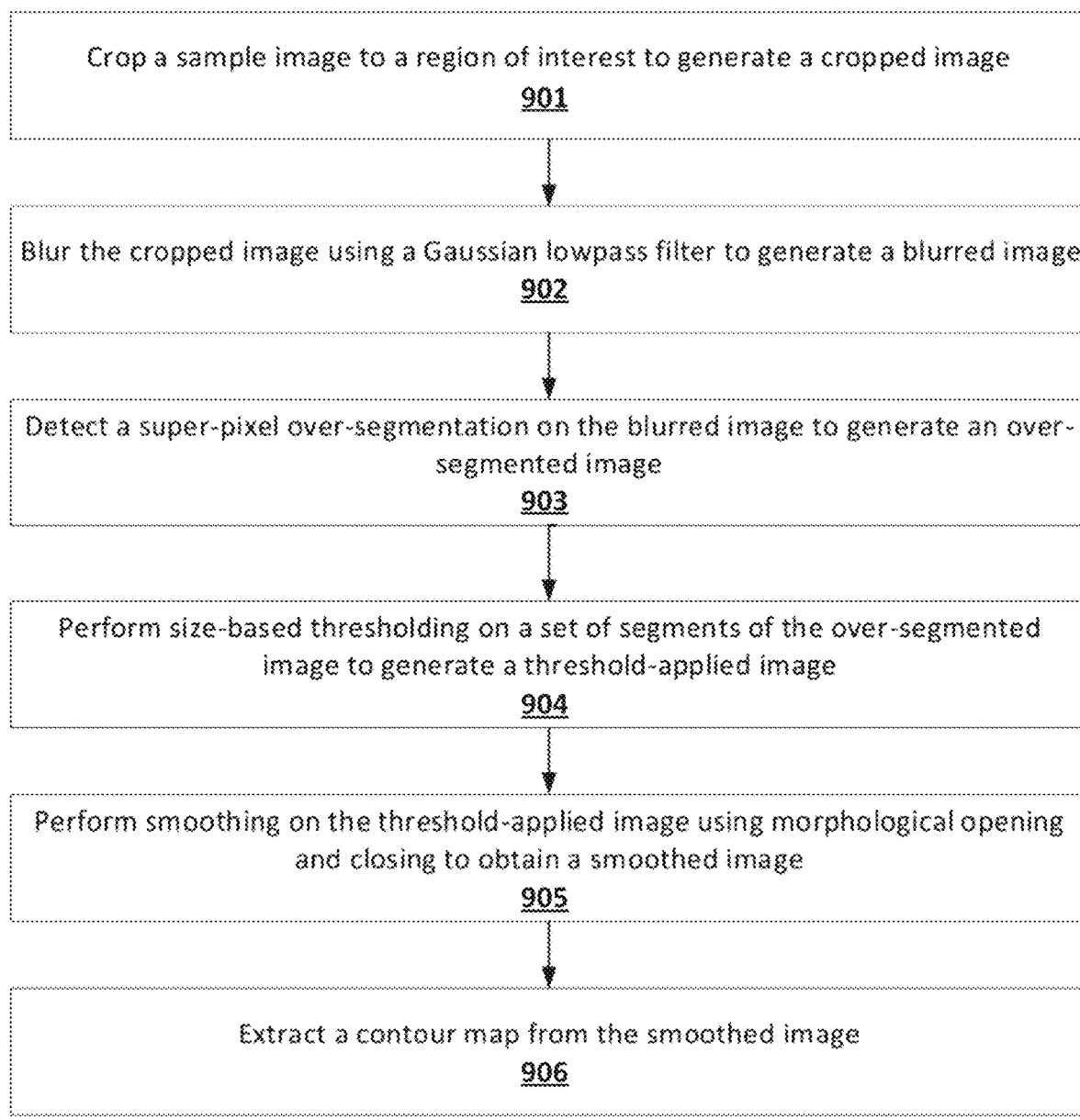

FIG. 9 is a flowchart diagram of an example process for performing contouring on an image in a set of sample images in accordance with various embodiments of the present invention.

Figure 10:
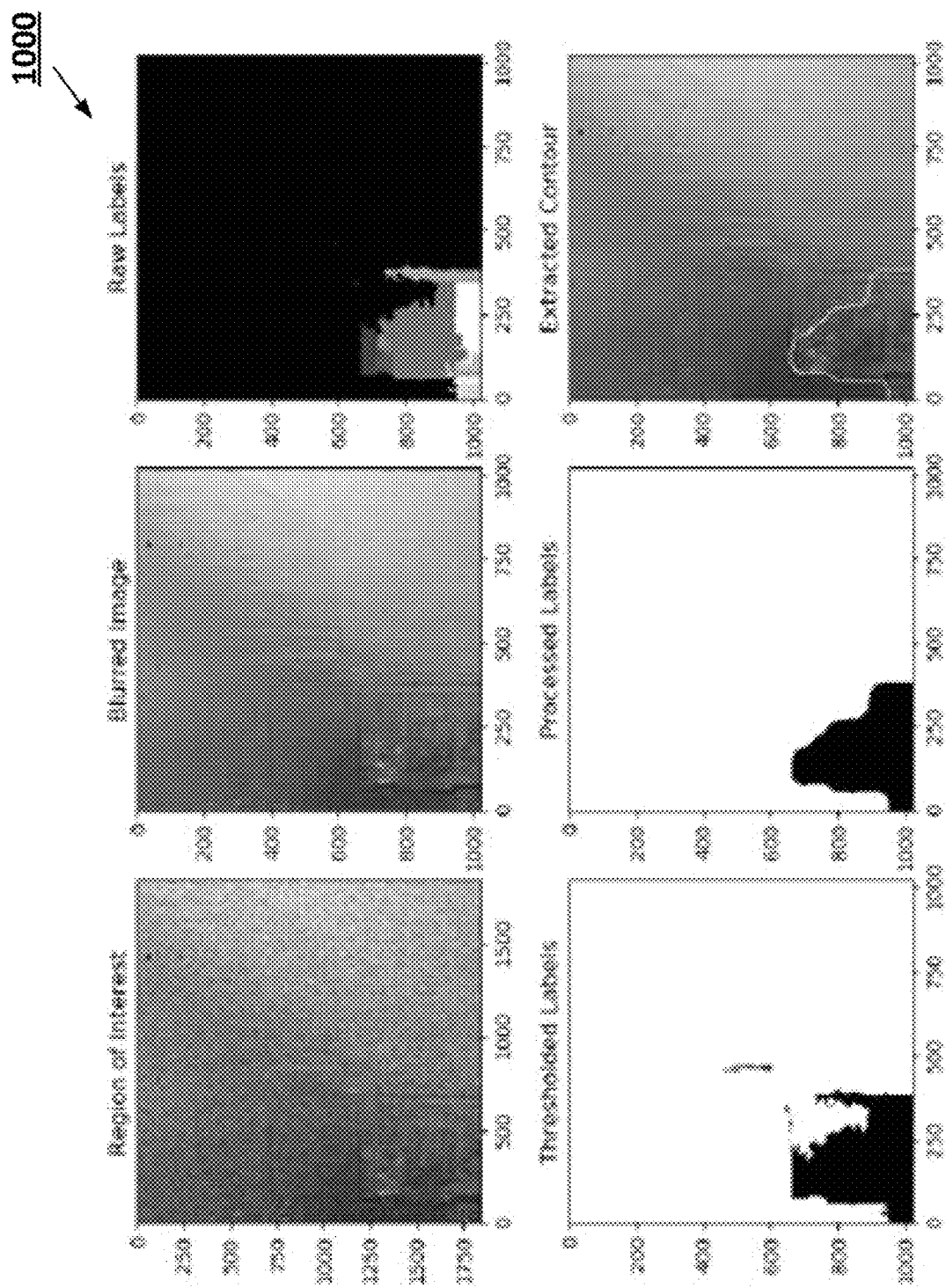

FIG. 10 depicts an example of processing steps used to extract a contour map from an image captured for a silicon die in accordance with various embodiments of the present invention.

Figure 11:
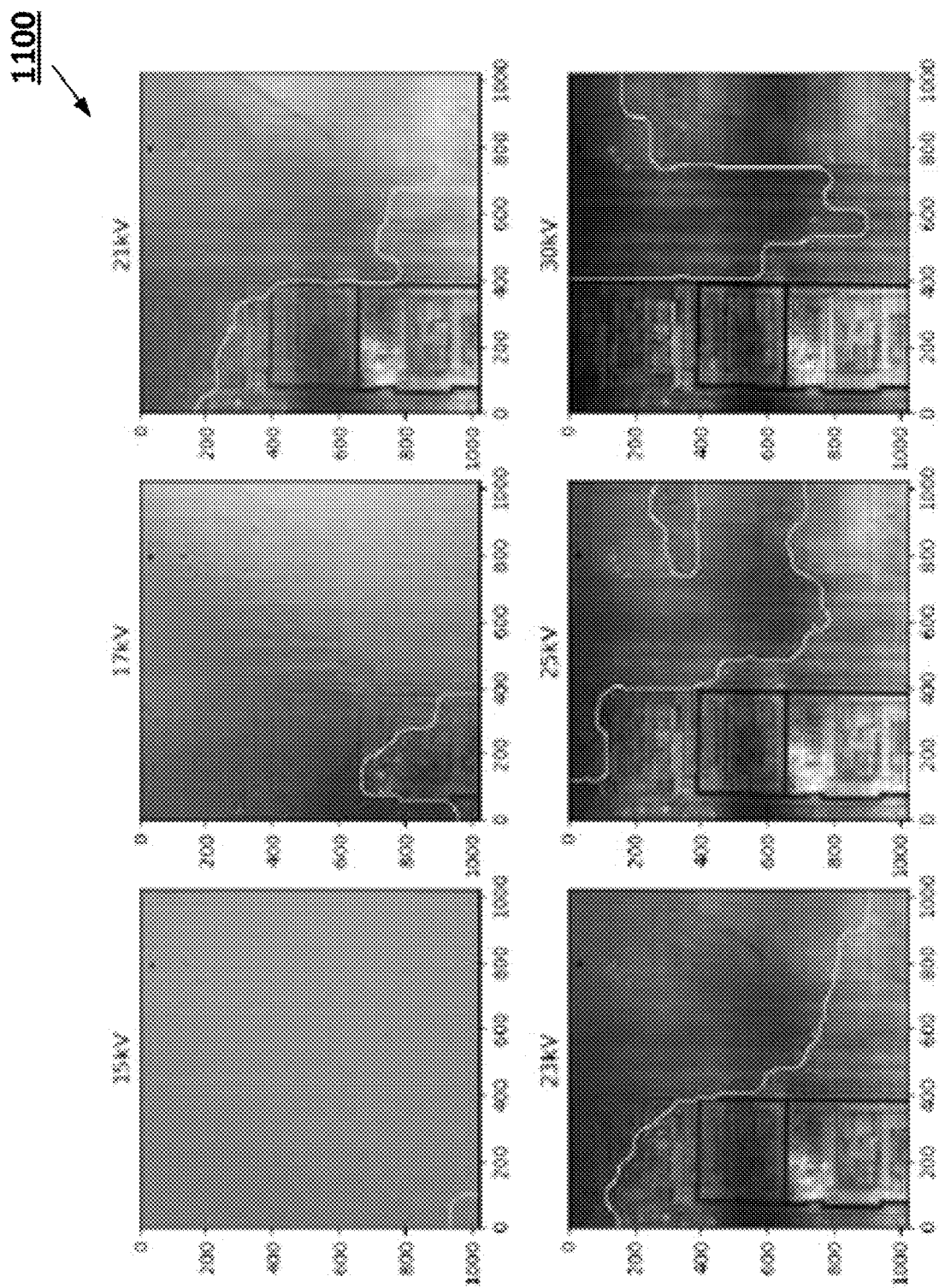

FIG. 11 depicts an example of contour maps as generated in accordance with various embodiments of the present invention.

Figure 12:
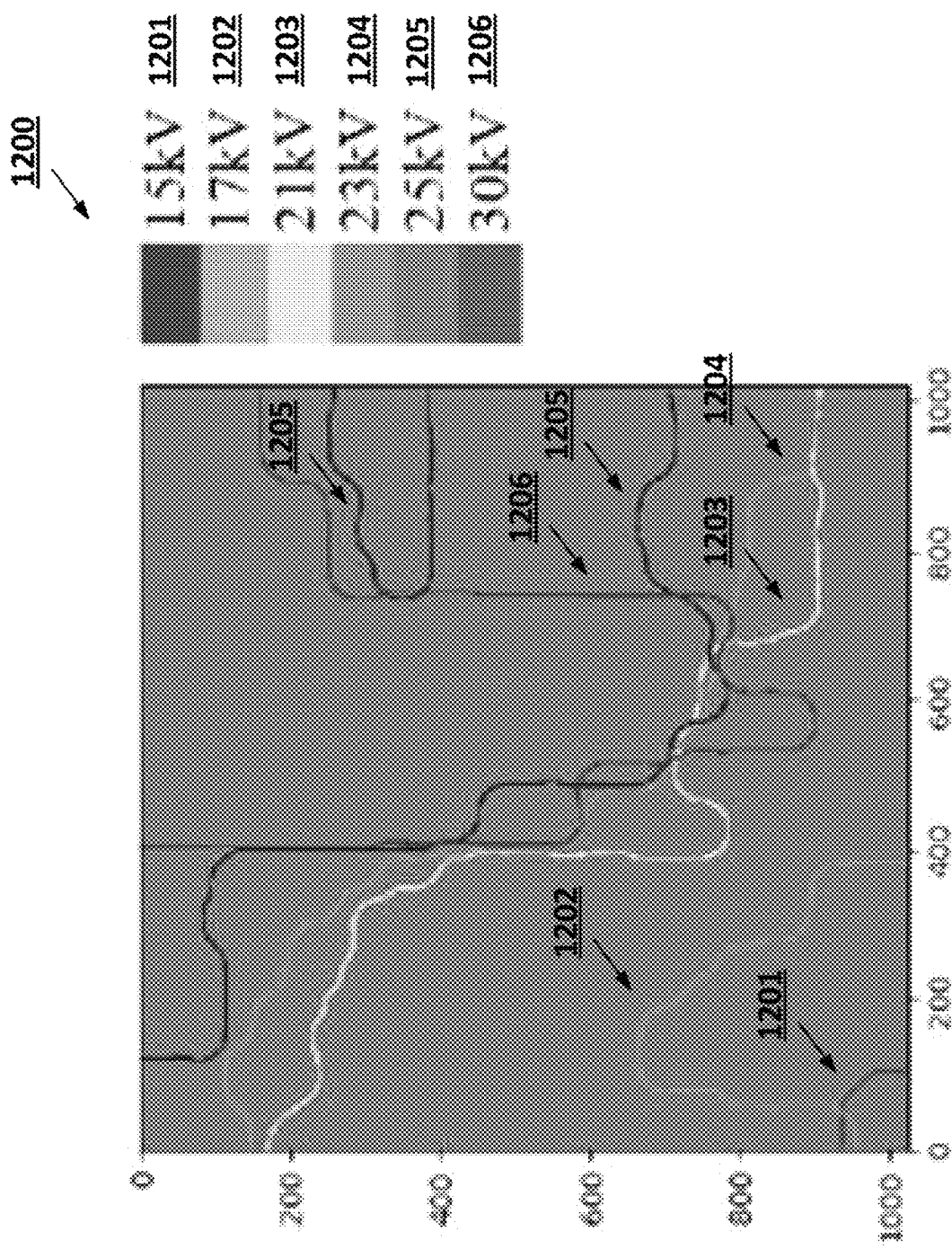

FIG. 12 depicts an example of all contour maps on a single plot as generated in accordance with various embodiments of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, one of ordinary skill in the art will recognize that the disclosed concepts can be used to perform other types of data analysis.

Overview

Various embodiments of the present invention provide techniques for hardware deprocessing using voltage imaging that may be used within a hardware assurance process. By using scanning electron microscopy (SEM) incorporated with focused ion beam (FIB), a dynamically adaptable delayering procedure is modified to address a challenge of uniform deprocessing. To that end, various embodiments of the invention involve performing an evaluation of a thickness of a remaining silicon in hardware such as an integrated circuit (IC), prior to adjusting a deprocessing rate at different locations of a silicon die.

In particular embodiments, a set of thickness-based contour maps are generated from a set of images captured of the IC at the different locations using different electron beam voltages. In addition, in particular embodiments, a set of estimated electron beam penetration depths are generated for the set of images using a processing technique such as a Monte Carlo simulation. Accordingly, in various embodiments, the set of thickness-based contour maps and set of estimated electron beam penetration depths may then be used in generating an estimated thickness measurement of the remaining silicon at the backside of the silicon die for the hardware. The estimated thickness measurement may then be used in particular embodiments for adjusting the deprocessing rate prior to hardware deprocessing. In addition, in some embodiments, the actual thickness may be measured using a confocal microscope and used to calibrate the estimate.

Computer Program Products, Methods, and Computing Entities

Embodiments of the present invention may be implemented in various ways, including as computer program products that comprise articles of manufacture. Such computer program products may comprise one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may comprise a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media comprise all computer-readable media (including volatile and non-volatile media).

In one embodiment, a non-volatile computer-readable storage medium may comprise a floppy disk, flexible disk, hard disk, solid-state storage (SSS) (e.g., a solid-state drive (SSD), solid-state card (SSC), solid-state module (SSM), enterprise flash drive, magnetic tape, or any other non-transitory magnetic medium, and/or the like. A non-volatile computer-readable storage medium may also comprise a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also comprise read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also comprise conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may comprise random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary Scanning Electron Microscopy System with Focus Ion Beam Setup

Various embodiments of the invention are carried out using images produced via a Scanning Electron Microscopy (SEM) environment configured with a focus ion beam (FIB). Turning now to FIG. 1, this figure provides a schematic configuration of a SEM system with FIB that can be used in accordance with various embodiments of the present invention. The body 110 of the SEM microscope includes an electron gun 115 through which a focused beam of ions (e.g., gallium) 120 is emitted and converged by a lens (not shown) and irradiated on a sample 125. A detector 130 detects the intensity of secondary electrons, secondary ions, and/or neutral atoms generated from the surface of the sample 125 or intensity of reflected ions and/or electrons by beam irradiation. Accordingly, an amplifier 135 amplifies the beam 120 and a deflector 140 deflects the beam 120, subjecting the beam 120 to raster scanning on the sample surface according to a control signal 145 provided by a controlling computing entity 150. Here, the control signal 145 indicates parameters for performing the scanning of the sample 125 such as, for example, the electron beam voltage that is to be used in producing various images of the sample. One or more input devices 155 such as a keyboard and/or a mouse may be connected to the controlling computing entity 150. A signal outputted from the amplifier 135 is converted from analog to digital via an imaging computing entity 160 to generate digital image data. In particular embodiments, the controlling and imaging computing entities 150, 160 may be the same entity. Accordingly, discussed further herein, a hardware assurance system 100 in various embodiments makes use of the image data for performing hardware assurance.

Exemplary System Architecture

FIG. 2 is a schematic diagram of an example system architecture that may be used for performing hardware assurance according to various embodiments. Accordingly, the system architecture may include a hardware assurance system 100. In particular embodiments, the hardware assurance system 100 may communicate with various computing entities, such as the imaging computing entity 160 previously discussed, using one or more communication networks. The one or more communication networks may include wired and/or wireless communication networks such as, for example, wired or wireless local area networks (LANs), personal area networks (PANs), metropolitan area networks (MANs), wide area network (WANs), and/or the like, as well as any hardware, software and/or firmware required to implement such network(s) (such as, e.g., network routers, and/or the like).

In particular embodiments, the hardware assurance system 100 includes a hardware assurance computing entity 106 and a storage subsystem 108. Here, the hardware assurance computing entity 106 may be configured to perform hardware assurance on hardware involving hardware deprocessing and netlist extraction on the hardware based at least in part on annotation data. The storage subsystem 108 may be configured to store hardware images used by the hardware assurance computing entity 106 in performing hardware assurance on the hardware. In addition, in some embodiments, the storage subsystem 108 may be configured to also store model definition data (information) for one or more deprocessing models used by the hardware assurance computing entity 106 in performing hardware deprocessing. Accordingly, the storage subsystem 108 may include one or more storage units, such as multiple distributed storage units, that are connected through one or more communication networks. The one or more communication networks may include wired and/or wireless communication networks such as, for example, wired or wireless local area networks (LANs), personal area networks (PANs), metropolitan area networks (MANs), wide area network (WANs), and/or the like, as well as any hardware, software and/or firmware required to implement such network(s) (such as, e.g., network routers, and/or the like). In addition, in particular embodiments, each storage unit in the storage subsystem 108 may be configured to store at least one of one or more information/data assets and/or one or more information/data about the computed properties of one or more information/data assets. Moreover, each storage unit in the storage subsystem 108 may comprise one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Hardware Assurance Computing Entity

FIG. 3 provides a schematic of a hardware assurance computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the hardware assurance computing entity 106 may also comprise one or more communications interfaces 320 for communicating with various computing entities, such as by communicating data, content, information, and/or similar terms used herein interchangeably that can be transmitted, received, operated on, processed, displayed, stored, and/or the like.

As shown in FIG. 3, in one embodiment, the hardware assurance computing entity 106 may comprise or be in communication with one or more processing elements 305 (also referred to as processors, processing circuitry, and/or similar terms used herein interchangeably) that communicate with other elements within the hardware assurance computing entity 106 via a bus, for example. As will be understood, the processing element 205 may be embodied in a number of different ways.

For example, the processing element 305 may be embodied as one or more complex programmable logic devices (CPLDs), microprocessors, multi-core processors, coprocessing entities, application-specific instruction-set processors (ASIPs), microcontrollers, and/or controllers. Further, the processing element 305 may be embodied as one or more other processing devices or circuitry. The term circuitry may refer to an entirely hardware embodiment or a combination of hardware and computer program products. Thus, the processing element 205 may be embodied as integrated circuits, application-specific integrated circuits (ASICs), field-programmable gate arrays (FPGAs), programmable logic arrays (PLAs), hardware accelerators, other circuitry, and/or the like.

As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the hardware assurance computing entity 106 may further comprise or be in communication with non-volatile media (also referred to as non-volatile storage, memory, memory storage, memory circuitry, and/or similar terms used herein interchangeably). In one embodiment, the non-volatile storage or memory may comprise one or more non-volatile storage or memory media 310, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity—relationship model, object model, document model, semantic model, graph model, and/or the like.

In one embodiment, the hardware assurance computing entity 106 may further comprise or be in communication with volatile media (also referred to as volatile storage, memory, memory storage, memory circuitry, and/or similar terms used herein interchangeably). In one embodiment, the volatile storage or memory may also comprise one or more volatile storage or memory media 315, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 305. Thus, the databases, database instances, database management systems, data, applications, programs, program modules, scripts, source code, object code, byte code, compiled code, interpreted code, machine code, executable instructions, and/or the like may be used to control certain aspects of the operation of the hardware assurance computing entity 106 with the assistance of the processing element 305 and operating system.

As indicated, in one embodiment, the hardware assurance computing entity 106 may also comprise one or more communications interfaces 320 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the hardware assurance computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the hardware assurance computing entity 106 may comprise or be in communication with one or more input elements, such as a keyboard input, a mouse input, a touch screen/display input, motion input, movement input, audio input, pointing device input, joystick input, keypad input, and/or the like. The hardware assurance computing entity 106 may also comprise or be in communication with one or more output elements (not shown), such as audio output, video output, screen/display output, motion output, movement output, and/or the like.

Exemplary System Operations

The logical operations described herein may be implemented (1) as a sequence of computer-implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Hardware Assurance

FIG. 4 is a flowchart diagram of an example process 400 for performing hardware assurance according to various embodiments. The steps/operations of the process 400 provided in FIG. 4 can efficiently and reliably delayer hardware such as an integrated circuit (IC), and in turn facilitate extracting annotation data on the hardware and performing netlist extraction based at least in part on the annotated data. For convenience, the remainder of the disclosure is described as performing hardware assurance on an IC. Although those of ordinary skill in the art should understand in light of this disclosure, that embodiments of the invention may be used in performing hardware assurance on other forms of hardware.

The process 400 begins at step/operation 401 with sample preparation being performed on the IC sample. Accordingly, in various embodiments, preparation is performed on the IC sample to expose the silicon die of the chip prior to generating a set of sample images of a backside of the IC. As explained further herein, the sample preparation in various embodiments involves initially removing the outer package to expose the backside of the silicon die. For example, the packaging material may be removed using techniques such as mechanical polishing and chemical etching, planarization, cleaning, and/or the like. Once the silicon substrate is exposed, the bulk silicon may be removed in various embodiments using one or more polishing techniques.

Once the die is exposed, At step/operation 402, iterative in-situ delayering (also known as deprocessing) and imaging are performed to evaluate the chip layer-by-layer at the metal and transistor level. Accordingly, in particular embodiments, each layer of the hardware is removed to prepare the individual layers for imaging by at least one of: a plasma etching technique, a chemical etching technique, and/or a mechanical polishing technique. That is to say, depending on the embodiment, the outer package of the hardware may be removed using any suitable technique known in the art.

Depending on the embodiment, the delayering may be performed from the frontside (top metal layer of the chip) or the backside (substrate of the chip). However, inherent nonuniformity of the substrate often poses a challenge in accurately estimating thickness during deprocessing. This nonuniformity may be due to the silicon die not being perfectly level when the IC leaves the foundry. In addition, nonuniformity can be further exacerbated during the hardware assurance process due to complex thermal and mechanical deformations.

In various embodiments, the image of a transistor layer, taken from the backside of the die, may be compared with a golden sample, e.g., a golden layout, to detect any malicious modification. During the delayering, a bare die is first exposed by de-packaging the chip. However, such de-packaging exposes only the first layer of material, that is the silicon. To further access the transistor layer of the IC, additional thinning is often performed using an ultra-thinning machine. However, it may be important to remove the remaining silicon as evenly as possible to preserve the transistor structure, as SEM imaging is oftentimes very sensitive to the thickness of surface materials. Therefore, nonuniformity of the die has become a challenge.

Accordingly, various embodiments of the invention provide for a dynamically adaptable delayering procedure using FIB that can be modified to address the challenge of uniform deprocessing. Specifically, various embodiments provide for evaluating the thickness of the remaining silicon in the IC, and adjusting the deprocessing rate at different locations of the die accordingly. That is to say, embodiments of the invention are configured to determine the thickness of the leftover silicon in the IC during the iterative imaging-delaying cycle.

As discussed further herein, various embodiments of the invention use electron beam (E-beam) voltage imaging, image processing, and calculated penetration depth of the E-beam voltage in adjusting the deprocessing rate. At step/operation 403, the process 400 involves the use of An E-beam voltage source to obtain SEM images of the IC sample and image processing is used to generate contour maps from the images of regions for the die with similar thickness. At step/operation 404, the process 400 continues with conducting a simulation to calculate the penetration depth of the E-beam voltage for each of the images. The calculated penetration depths, along with the contour maps, are then used to estimate the thickness of left-over silicon at the backside of the die.

Accordingly, in various embodiments, the estimated thickness measurement can then be used in adjusting the deprocessing rate. For instance, in some embodiments, a determination may be made as to whether the difference between the estimated thickness measurement and a desired thickness of the sample satisfies a configurable threshold. If so, then the deprocessing rate (e.g. FIB parameters (ion beam)) may be adjusted accordingly.

The process 400 continues at step/operation 405 with generating annotation data for the IC. In particular embodiments, the annotation data may include information on the thickness of the silicon left on the backside of the hardware. Finally, at step/operation 406, the process 400 concludes with extracting a netlist for the IC. In various embodiments, the netlist extraction on the IC may be performed using the annotation data. Accordingly, the extracted netlist may include a description of connectivity of the hardware, a list of the electronic components found in the hardware, a list of nodes the electronic components are connected to, and/or the like. Further detail is now provided on different aspects of the process 400 according to various embodiments.

Sample Preparation and Image Collection

A flowchart of performing sample preparation on the IC according to various embodiments is depicted in FIG. 5. At step/operation 501 of FIG. 5, an outer package of the IC is removed to expose the backside of the IC, e.g., the backside of the silicon die. For example, the packaging material can be removed by mechanical polishing or acid etching. As another non-limiting example, the packaging material can be removed by using one or more thermal and/or mechanical techniques. In addition, the bulk silicon is removed in various embodiments once the silicon substrate is exposed. For example, one or more polishing techniques may be used in removing the bulk silicon.

At step/operation 502, planarization and ultra-thinning are performed on the backside of the IC to generate an ultra-thinned sample. For instance, in particular embodiments, the planarization and ultra-thinning of the silicon die may be performed from the backside of the IC using a precise 5-axis computer numerical control (CNC) milling machine. Here, the CNC milling may involve a process of machining by using rotary cutters to remove material by advancing a cutter into the backside of the IC. In some embodiments, the CNC milling machine may be a machine augmented by automatic tool changers, tool magazines or carousels, and/or coolant systems. For example, the additional thinning may thin the die down to about 0.5 µm to about 1.5 µm.

During planarization, the backside of the hardware can be smoothed using a combination of chemical and mechanical forces. For instance, in particular embodiments, the planarization may involve using a hybrid of chemical etching and free abrasive polishing. In other embodiments, the planarization may involve using an abrasive and corrosive chemical slurry, such as a colloid, in conjunction with a polishing pad and a (e.g., plastic) retaining ring. Here, the retaining ring may have a larger diameter than the hardware and the pad and hardware are pressed together by a dynamic polishing head and held in place by the retaining ring. The dynamic polishing head is then rotated with different axes of rotation, e.g., not concentric, which removes material and tends to even out any irregular topography, making the hardware flat or planar. Depending on the embodiment, the planarization and ultra-thinning may be performed by any suitable technique known in the art.

Finally, at step/operation 503, a set of sample images (image information/data) are generated and collected at different locations of the ultra-thinned sample. In various embodiments, SEM imaging is used to scan the entire die as quickly as possible while still capturing sufficient feature details. This can help to reduce complexity and processing time for generating a contour map in some embodiments.

Accordingly, in various embodiments, the set of images are captured using different electron beam (E-beam) voltages at a set of desired backside locations. For instance, in some embodiments, a focus ion beam scanning electron microscope (FIB-SEM) is used to capture (or receive) the set of sample images (image information/data) using the different E-beam voltages. The E-beam voltage, which denotes the beam energy, affects penetration depth of the E-beam, the penetration depth being the interaction volume of the E-beam within the sample. For example, images taken with lower E-beam voltages can expose active layers, while images taken with higher E-beam voltages can provide more detail from the sample's deeper subsurface features, including the polysilicon and higher metal layers.

In some embodiments, the images may be collected using two different modes: 1) back-scattered electrons (BSEs); and 2) secondary electrons (SEs). BSEs comprise high-energy electrons originating in the electron beam, which are reflected, e.g., back-scattered, out of the sample interaction volume by elastic scattering interactions with the sample atoms. Since heavy elements, e.g., elements with a high atomic number, back-scatter electrons more strongly than light elements, e.g., elements with a low atomic number, they appear brighter in the image, BSEs are typically used to detect contrast between areas with different chemical composition. Accordingly, BSE imaging may be used because it offers better voltage contrast and fewer image artifacts. SEs, on the other hand, are ejected from conduction or valence bands of the sample atoms by inelastic scattering interactions with electron beams. Since SEs have lower energy than BSEs, SEs typically originate from within a few nanometers below the sample surface.

FIG. 6 depicts an example 600 of five different locations 601, 602, 603, 604, 605 on a silicon die that may use for capturing images. In this example, six sample images are captured at different E-beam voltages, e.g., 15 kV, 17 kV, 21 kV, 23 kV, 25 kV, and 30 kV, for each of the five different locations 601, 602, 603, 604, 605. As those of ordinary skill in the art will recognize, the set of collected images can be saved using a variety of resolutions and/or formats depending on the embodiment. For example, the images may be collected and saved as 1024×1024 pixel TIFF-formatted greyscales.

Iterative In-Situ Delayering

A flowchart for performing iterative in-situ delaying according to various embodiments is depicted in FIG. 7. As previously discussed, once the steps/operations depicted in FIG. 7 are performed on the set of images for the IC sample, the backside of the sample may be delayered and imaged again in some embodiments, and the iterative in-situ delayering steps/operations may be performed on the set of images captured for the newly delayered sample.

The process 700 begins at step/operation 701 with the hardware assurance computing entity 106 performing contouring on the set of images captured for the delayered IC sample to generate a set of thickness-based contour maps. Since the thickness of the die is nonuniform, subsurface features, e.g., regions, may appear in the collected sample images as the beam voltage varies. Therefore, in various embodiments, the hardware assurance computing entity 106 uses image processing to generate the contour maps denoting the regions with similar amounts of remaining silicon. Accordingly, the contour maps may be configured in particular embodiments with contour lines joining points of equal thickness. Further detail is provided in FIG. 9 on generating a contour map for a particular image.

Continuing, at step/operation 702, the hardware assurance computing entity 106 generates a set of estimated E-beam penetration depths for the set of images. Depending on the embodiment, this particular step/operation may be performed in sequence or in parallel with the previous step/operation for generating the set of thickness-based contour maps. A penetration depth is a measure of how deeply an E-beam can penetrate into a medium, and is defined as the depth at which the intensity of the E-beam inside the sample falls to 1/e of its original value. In various embodiments, the hardware assurance computing entity 106 is configured to determine the penetration depth for each sample image based at least in part on the E-beam voltage associated with the sample image. Accordingly, in particular embodiments, the hardware assurance computing entity 106 determines the penetration depth for the image by using a processing technique to generate an estimated E-beam penetration depth such as, for example, a Monte Carlo simulation to generate the estimated E-beam penetration depth For instance, in the particular embodiments in which the hardware assurance computing entity 106 conducts the Monte Carlo simulation, the hardware assurance computing entity 106 determines a domain of possible inputs, and randomly generates the inputs from a probability distribution over the determined domain. Afterward, the hardware assurance computing entity 106 performs a deterministic computation on the inputs and aggregates the results. For instance, in particular embodiments, the electron distribution can be modeled as a Gaussian process from the origin of the beam. Here, the hardware assurance computing entity 106 makes a determination as to which atom is responsible for the elastic scattering of the beam by using Equation 1:

$$\text{Random} > \sum_{i=1}^{n} \frac{\sigma_i F_i}{\sum_{i=1}^{n} \sigma_i F_i} \qquad \text{Equation 1}$$

where Random is a random number uniformly distributed between 0 and 1, $\sigma_i$ is a total cross-section of element i, $F_i$ is an atomic fraction of element i, and n is a number of elements in the region. Accordingly, the hardware assurance computing entity 106 then calculates the polar angle of collision of the elastic scattering based at least in part on a partial cross-section of the responsible element. When equation 1 is true, element i is responsible for the collision. Therefore, the polar angle of collision, θ, can be computed by solving Equation 2:

$$R = \frac{\int_0^\theta \frac{d\sigma}{d\theta} \text{Sin}\theta \, d\theta}{\int_0^\pi \frac{d\sigma}{d\theta} \text{Sin}\theta \, d\theta} \qquad \text{Equation 2}$$

where $$\frac{d\sigma}{d\theta}$$

is the partial cross-section of element i, and R is a random number.

The hardware assurance computing entity 106 then uses the computed polar angle of collision θ to compute a travel distance, L, between two collisions. According to continuous slowing down approximation (CDSA), the energy loss resulting from inelastic collisions between individual elastic scattering events can be simulated from stopping-power theory. Therefore, the energy lost during the travel distance, L, can be modeled as a constant value. Thus, the hardware assurance computing entity 106 can compute the energy at position i along a trajectory using equation 3.

$$E_i = E_{i-1} + (dE/dS)L \qquad \text{Equation 3}$$

where $E_{i-1}$ and $E_i$ are energies at previous and current collision and (dE/dS) is a rate of energy loss.

Accordingly, in various embodiments, the hardware assurance computing entity 106 can use the Monte Carlo simulation to simulate the electron beam by scattering the electrons from one location, e.g., by a single scattering. Here, the hardware assurance computing entity 106 simulates the electron trajectories until the electrons either exit the sample or lose all energy and come to rest within the sample surface. In some embodiments, a reduction of the incident energy can minimize the interaction volume of the electron beam within the sample. While the shape of the interaction volume may not change dramatically with energy, the physical size of the interaction volume may. FIG. 8 depicts an example Monte Carlo simulation 800 of electron trajectories in a bulk sample of silicon at different accelerating voltages to illustrate the direct correlation between accelerating voltage and interaction volume.

At step/operation 703, the hardware assurance computing entity 106 generates the estimated thickness measurement. In various embodiments, the hardware assurance computing entity 106 is configured to generate the estimated thickness measurement based at least in part on the set of thickness-based contour maps and the estimated electron beam penetration depths. Alternatively, in some embodiments, the hardware assurance computing entity 106 may generate an estimated thickness measurement for each sample image based at least in part on the set of thickness-based contour maps and the determined penetration depth associated with the sample image.

Accordingly, in some embodiments, the hardware assurance computing entity 106 may be configured to use electron trajectories to show the BSEs. Here, the BSEs can possess enough energy to overcome an escape barrier of the surface of the IC (e.g., silicon die). Therefore, the hardware assurance computing entity 106 can detect the BSEs, which can provide information on deeper subsurface features of the IC (e.g., silicon die). Thus, the hardware assurance computing entity 106 can use this information to provide an estimate of the amount of silicon left at different locations of the IC. As previously mentioned, these estimated thickness measurements may then be used in various embodiments to adjust the deprocessing parameters (e.g., FIB parameters) in the feedback loop to allow for automated uniform iterative in-situ delayering.

Contour Map Generation

A flowchart of performing contouring on an image found in the set of sample images is depicted in FIG. 9. At step/operation 901, the hardware assurance computing entity 106 crops a sample image to a region of interest to generate a cropped image focusing on the region of interest. Accordingly, in particular embodiments, the hardware assurance computing entity 106 is configured to perform the cropping by removing one or more peripheral areas of the sample image to focus on the region of interest, as well as change an aspect ratio of the sample image in some instances. Further, in some embodiments, the hardware assurance computing entity 106 is configured to perform the cropping to remove one or more peripheral areas of the sample image to accentuate or isolate a subject matter from a background of the sample image.

At step/operation 902, the hardware assurance computing entity 106 blurs the cropped image using a lowpass filter. Accordingly, in particular embodiments, the lowpass filter can be configured to allow signals to pass with a frequency lower than a selected cutoff frequency and attenuate signals with frequencies higher than the cutoff frequency. In some embodiments, the frequency response of the lowpass filter depends on the filter design. For instance, in some embodiments, the lowpass filter is a Gaussian low pass filter with a Gaussian-shaped amplitude and/or frequency response and a binomial impulse response which approximates a Gaussian point spread function in the time spatial domain.

At step/operation 903, the hardware assurance computing entity 106 obtains a superpixel over-segmentation of the blurred image, to generate an over-segmented image. A goal of over-segmentation is to simplify and/or change the representation of the sample image. Superpixels may comprise groups of pixels with a similar property, such as a similar color. In addition, superpixels may comprise groups of pixels which perceptually belong together and can reduce a number of primitives for subsequent processes. Accordingly, in various embodiments, the hardware assurance computing entity 106 uses the superpixel over-segmentation to locate objects and boundaries, e.g., lines, curves, etc. in the sample image. In some embodiments, the hardware assurance computing entity 106 detects the superpixels using a Felzenszwalb's method. The Felzenszwalb's method yields a higher number of small superpixels in regions with high contrast and a smaller number of large superpixels in regions with low variation. Here, the regions where hardware structures are visible normally have high contrast, while the regions where hardware structures are not visible normally have low contrast.

At step/operation 904, the hardware assurance computing entity 106 performs thresholding on a set of segments of the over-segmented image to generate a threshold-applied sample image. Specifically, in particular embodiments, the hardware assurance computing entity 106 performs size-based thresholding based at least in part on a size of the segments. Accordingly, the hardware assurance computing entity 106 may perform the thresholding to differentiate large segments from small segments in the over-segmented image.

For example, upon a determination that a superpixel is larger than a first configurable threshold, the hardware assurance computing entity 106 may be configured to assign the superpixel as a background of the sample image, e.g., assign a black color to the superpixel. Here, a superpixel size larger than the first configurable threshold may indicate small variation, e.g., few visible features, in the superpixel. Accordingly, upon a determination that a superpixel is smaller than a second configurable threshold, the hardware assurance computing entity 106 may be configured to assign the superpixel as a foreground of the sample image, e.g., assign a white color to the superpixel. Here, a superpixel size smaller than the second configurable threshold may indicate high contrast, e.g., more visible features, in the superpixel.

At step/operation 905, the hardware assurance computing entity 106 performs contour smoothing on the threshold-applied image. Accordingly, in various embodiments, the hardware assurance computing entity 106 is configured to perform the contour smoothing on the threshold-applied image using morphological opening and closing to obtain a contour-smoothed image. In some embodiments, the hardware assurance computing entity 106 may use the morphological opening to remove small objects in the background of the image and change small islands of the foreground into the background. Similarly, in some embodiments, the hardware assurance computing entity 106 may use the morphological closing to remove small holes in the foreground and change small islands of background into foreground. Yet, in some embodiments, the hardware assurance computing entity 106 may use the contour smoothing technique to find specific shapes in the sample image. Finally, at step/operation 906, the hardware assurance computing entity 106 extracts a contour map from the smoothed image.

Here, in particular embodiments, the hardware assurance computing entity 106 is configured to generate a contour map illustrated with contour lines. Accordingly, each contour line may be a curve along which the thickness of a region the contour line encompass is a constant value. Generally, a contour line for a function of two variables is a curve connecting points where the function has the same value.

FIG. 10 provides an example 1000 demonstrating the different contouring steps, shown as applied on BSE images captured at Location 1 601 of the silicon die shown in FIG. 6. FIG. 11 depicts the extracted contours 1100 for Location 1 601 of the silicon die for each accelerating voltage, plotted on the corresponding images. Here, the contours separate the boundary between regions with high versus low feature visibility. Finally, FIG. 12 provides all the contours 1201, 1202, 1203, 1204, 1205, 1206 plotted on the same plot 1200.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for setting one or more deprocessing parameters used in conducting hardware deprocessing on a hardware, the method comprising:
  receiving, via one or more processors, a set of sample images using a plurality of electron beam (E-beam) voltages for the hardware, wherein each sample image of the set of sample images is captured from a backside of the hardware using an E-beam voltage of the plurality of E-beam voltages;
  generating, via the one or more processors, a set of thickness-based contour maps, wherein each thickness-based contour map of the set of thickness-based contour maps is generated for a sample image of the set of sample images and comprises one or more contour lines indicating locations on the backside of the hardware having a same thickness of remaining material;
  generating, via the one or more processors, a set of estimated E-beam penetration depths, wherein each estimated E-beam penetration depth of the set of estimated E-beam penetration depths is generated for a sample image of the set of sample images and is based at least in part on the E-beam voltage used to capture the sample image;
  generating, via the one or more processors, an estimated thickness measurement of the remaining material for the backside of the hardware based at least in part on the set of thickness-based contour maps and the set of estimated E-beam penetration depths; and
  setting, via the one or more processors, the one or more deprocessing parameters based at least in part on the estimated thickness measurement.

2. The method of claim 1 further comprising conducting the hardware deprocessing on the hardware using the one or more deprocessing parameters after setting the one or more deprocessing parameters based at least in part on the estimated thickness measurement.

3. The method of claim 2, further comprising, after conducting the hardware deprocessing on the hardware:
  generating annotation data for the hardware, wherein the annotation data is based at least in part on the estimated thickness measurement; and
  extracting a netlist for the hardware using the annotation data.

4. The method of claim 1, wherein setting the one or more deprocessing parameters comprises:
  determining a difference between the estimated thickness measurement and a desired thickness of the hardware; and
  responsive to the difference satisfying a configurable threshold, adjusting a deprocessing rate.

5. The method of claim 1, wherein generating the set of thickness-based contour maps comprises, for each thickness-based contour map of the set of thickness-based contour maps:
  cropping a sample image of the set of sample images to a region of interest to generate a cropped image;
  blurring the cropped image using a lowpass filter to generate a blurred image;
  detecting a superpixel over-segmentation on the blurred image to generate an over-segmented image;
  performing size-based thresholding on a set of segments of the over-segmented image to generate a threshold-applied image;
  performing contour smoothing on the threshold-applied image using morphological opening and closing to obtain a smoothed image; and
  extracting a contour map from the smoothed image.

6. The method of claim 1, wherein generating the set of estimated E-beam penetration depths comprises, for each estimated E-beam penetration depth of the set of estimated E-beam penetration depths, conducting a Monte Carlo simulation for a sample image of the set of sample images captured using an E-beam voltage of the plurality of E-beam voltages to generate the estimated E-beam penetration depth for the sample image.

7. The method of claim 1, wherein the set of sample images are captured using a scanning electron microscope incorporated with focused ion beam, and the method further comprises performing planarization and ultra-thinning on the backside of the hardware prior to capturing the set of sample images.

8. The method of claim 1, wherein the hardware comprises an integrated circuit, the backside comprises a silicon die, and the remaining material comprises silicon.

9. An apparatus for setting one or more deprocessing parameters used in conducting hardware deprocessing on a hardware, the apparatus comprising at least one processor and at least one memory including program code, the at least one memory and the program code configured to, with the at least one processor, cause the apparatus to at least:
receive a set of sample images using a plurality of electron beam (E-beam) voltages for the hardware, wherein each sample image of the set of sample images is captured from a backside of the hardware using an E-beam voltage of the plurality of E-beam voltages;
generate a set of thickness-based contour maps, wherein each thickness-based contour map of the set of thickness-based contour maps is generated for a sample image of the set of sample images and comprises one or more contour lines indicating locations on the backside of the hardware having a same thickness of remaining material;
generate a set of estimated E-beam penetration depths, wherein each estimated E-beam penetration depth of the set of estimated E-beam penetration depths is generated for a sample image of the set of sample images and is based at least in part on the E-beam voltage used to capture the sample image;
generate an estimated thickness measurement of the remaining material for the backside of the hardware based at least in part on the set of thickness-based contour maps and the set of estimated E-beam penetration depths; and
set the one or more deprocessing parameters based at least in part on the estimated thickness measurement.

10. The apparatus of claim 9, wherein the at least one memory and the program code are configured to, with the at least one processor, cause the apparatus to conduct the hardware deprocessing on the hardware using the one or more deprocessing parameters after setting the one or more deprocessing parameters based at least in part on the estimated thickness measurement.

11. The apparatus of claim 10, wherein the at least one memory and the program code are configured to, with the at least one processor, cause the apparatus to, after conducting the hardware deprocessing on the hardware:
generate annotation data for the hardware, wherein the annotation data is based at least in part on the estimated thickness measurement; and
extract a netlist for the hardware using the annotation data.

12. The apparatus of claim 9, wherein the at least one memory and the program code are configured to, with the at least one processor, cause the apparatus to set the one or more deprocessing parameters by:
determining a difference between the estimated thickness measurement and a desired thickness of the hardware; and responsive to the difference satisfying a configurable threshold, adjusting a deprocessing rate.

13. The apparatus of claim 9, wherein the at least one memory and the program code are configured to, with the at least one processor, cause the apparatus to generate the set of thickness-based contour maps by, for each thickness-based contour map of the set of thickness-based contour maps:
cropping a sample image of the set of sample images to a region of interest to generate a cropped image;
blurring the cropped image using a lowpass filter to generate a blurred image;
detecting a superpixel over-segmentation on the blurred image to generate an over-segmented image;
performing size-based thresholding on a set of segments of the over-segmented image to generate a threshold-applied image;
performing contour smoothing on the threshold-applied image using morphological opening and closing to obtain a smoothed image; and
extracting a contour map from the smoothed image.

14. The apparatus of claim 9, wherein the at least one memory and the program code are configured to, with the at least one processor, cause the apparatus to generate the set of estimated E-beam penetration depths by, for each estimated E-beam penetration depth of the set of estimated E-beam penetration depths, conducting a Monte Carlo simulation for a sample image of the set of sample images captured using an E-beam voltage of the plurality of E-beam voltages to generate the estimated E-beam penetration depth for the sample image.

15. A non-transitory computer storage medium comprising instructions for setting one or more deprocessing parameters used in conducting hardware deprocessing on a hardware, the instructions being configured to cause one or more computer processors to at least perform operations configured to:
receive a set of sample images using a plurality of electron beam (E-beam) voltages for the hardware, wherein each sample image of the set of sample images is captured from a backside of the hardware using an E-beam voltage of the plurality of E-beam voltages;
generate a set of thickness-based contour maps, wherein each thickness-based contour map of the set of thickness-based contour maps is generated for a sample image of the set of sample images and comprises one or more contour lines indicating locations on the backside of the hardware having a same thickness of remaining material;
generate a set of estimated E-beam penetration depths, wherein each estimated E-beam penetration depth of the set of estimated E-beam penetration depths is generated for a sample image of the set of sample images and is based at least in part on the E-beam voltage used to capture the sample image;
generate an estimated thickness measurement of the remaining material for the backside of the hardware based at least in part on the set of thickness-based contour maps and the set of estimated E-beam penetration depths; and
set the one or more deprocessing parameters based at least in part on the estimated thickness measurement.

16. The non-transitory computer storage medium of claim 15, wherein the instructions are configured to cause the one or more computer processors to at least perform operations configured to conduct the hardware deprocessing on the hardware using the one or more deprocessing parameters after setting the one or more deprocessing parameters based at least in part on the estimated thickness measurement.

17. The non-transitory computer storage medium of claim 16, wherein the instructions are configured to cause the one or more computer processors to at least perform operations configured to, after conducting the hardware deprocessing on the hardware:
generate annotation data for the hardware, wherein the annotation data is based at least in part on the estimated thickness measurement; and
extract a netlist for the hardware using the annotation data.

18. The non-transitory computer storage medium of claim 15, wherein the instructions are configured to cause the one or more computer processors to at least perform operations configured to set the one or more deprocessing parameters by:
determining a difference between the estimated thickness measurement and a desired thickness of the hardware; and
responsive to the difference satisfying a configurable threshold, adjusting a deprocessing rate.

19. The non-transitory computer storage medium of claim 15, wherein the instructions are configured to cause the one or more computer processors to at least perform operations configured to generate the set of thickness-based contour maps by, for each thickness-based contour map of the set of thickness-based contour maps:
cropping a sample image of the set of sample images to a region of interest to generate a cropped image;
blurring the cropped image using a lowpass filter to generate a blurred image;
detecting a superpixel over-segmentation on the blurred image to generate an over-segmented image;
performing size-based thresholding on a set of segments of the over-segmented image to generate a threshold-applied image;
performing contour smoothing on the threshold-applied image using morphological opening and closing to obtain a smoothed image; and
extracting a contour map from the smoothed image.

20. The non-transitory computer storage medium of claim 15, wherein the instructions are configured to cause the one or more computer processors to at least perform operations configured to generate the set of estimated E-beam penetration depths by, for each estimated E-beam penetration depth of the set of estimated E-beam penetration depths, conducting a Monte Carlo simulation for a sample image of the set of sample images captured using an E-beam voltage of the plurality of E-beam voltages to generate the estimated E-beam penetration depth for the sample image.

* * * * *